US009652016B2

(12) United States Patent
Diard

(10) Patent No.: US 9,652,016 B2
(45) Date of Patent: May 16, 2017

(54) TECHNIQUES FOR DEGRADING RENDERING QUALITY TO INCREASE OPERATING TIME OF A COMPUTING PLATFORM

(75) Inventor: Franck Diard, Mountain View, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 800 days.

(21) Appl. No.: 13/095,848

(22) Filed: Apr. 27, 2011

(65) Prior Publication Data
US 2012/0274641 A1 Nov. 1, 2012

(51) Int. Cl.
G06F 1/32 (2006.01)
G06T 15/00 (2011.01)

(52) U.S. Cl.
CPC .......... G06F 1/3203 (2013.01); G06T 15/005 (2013.01)

(58) Field of Classification Search
USPC ........................................ 345/428
See application file for complete search history.

(56) References Cited

U.S. PATENT DOCUMENTS

| 6,724,395 | B1* | 4/2004 | Treichler | 345/582 |
| 6,938,176 | B1* | 8/2005 | Alben et al. | 713/323 |
| 7,324,107 | B2* | 1/2008 | Liao et al. | 345/428 |
| 7,698,579 | B2* | 4/2010 | Hendry et al. | 713/300 |
| 7,721,118 | B1* | 5/2010 | Tamasi et al. | 713/300 |
| 7,730,336 | B2* | 6/2010 | Marinkovic et al. | 713/320 |
| 8,199,155 | B2* | 6/2012 | Leroy et al. | 345/502 |
| 8,310,488 | B2* | 11/2012 | Rose | 345/502 |
| 8,555,099 | B2* | 10/2013 | Marinkovic et al. | 713/324 |
| 2003/0201990 | A1* | 10/2003 | Aldrich et al. | 345/211 |
| 2004/0207653 | A1* | 10/2004 | Stavely et al. | 345/698 |
| 2005/0066205 | A1* | 3/2005 | Holmer | 713/320 |
| 2006/0221197 | A1* | 10/2006 | Jung et al. | 348/222.1 |
| 2007/0038939 | A1* | 2/2007 | Challen et al. | 715/734 |
| 2007/0046687 | A1* | 3/2007 | Soroushi et al. | 345/589 |
| 2007/0103836 | A1* | 5/2007 | Oh | 361/115 |
| 2007/0171230 | A1* | 7/2007 | Iwase et al. | 345/519 |

(Continued)

FOREIGN PATENT DOCUMENTS

WO WO 2009038902 A1 * 3/2009

OTHER PUBLICATIONS

Chang, Chen-Hao, Peter J. Lohrmann, Emmanuel O. Agu, and Robert W. Lindeman. "ENCORE: Energy-Conscious Rendering for Mobile Devices." In First Workshop on General Purpose Processing on Graphics Processing Units. 2007.*

(Continued)

Primary Examiner — Michelle Chin

(57) ABSTRACT

Techniques for degrading rendering performance to extend operating time of a computing platform includes determining a source and a level of power for the computing platform during receipt of the graphics data and rendering of the graphics data. Graphics data is rendered using settings received from the application if the computing platform is not operating from a limited power supply. The graphics data is rendered using one or more sets of graphics processing power conservation rendering settings if the computing platform is operating from a limited power supply and the remaining energy capacity of the limited power supply is less than one or more predetermined levels.

19 Claims, 4 Drawing Sheets

(56) References Cited

U.S. PATENT DOCUMENTS

| | | | |
|---|---|---|---|
| 2007/0229503 A1* | 10/2007 | Witzel et al. | 345/428 |
| 2007/0283175 A1* | 12/2007 | Marinkovic et al. | 713/320 |
| 2008/0034238 A1* | 2/2008 | Hendry et al. | 713/323 |
| 2008/0055331 A1* | 3/2008 | Iourcha et al. | 345/582 |
| 2008/0057894 A1* | 3/2008 | Aleksic et al. | 455/187.1 |
| 2008/0204460 A1* | 8/2008 | Marinkovic et al. | 345/502 |
| 2008/0309676 A1* | 12/2008 | Nehab et al. | 345/582 |
| 2009/0079746 A1* | 3/2009 | Howard et al. | 345/502 |
| 2009/0232480 A1* | 9/2009 | Jendbro | 386/117 |
| 2010/0164968 A1* | 7/2010 | Kwa et al. | 345/545 |
| 2010/0253690 A1* | 10/2010 | Rose | 345/502 |

OTHER PUBLICATIONS

Rofouei, Mahsan, Thanos Stathopoulos, Sebi Ryffel, William Kaiser, and Majid Sarrafzadeh. "Energy-aware high performance computing with graphic processing units." Workshop on power aware computing and system. 2008.*

* cited by examiner

TECHNIQUES FOR DEGRADING RENDERING QUALITY TO INCREASE OPERATING TIME OF A COMPUTING PLATFORM

BACKGROUND OF THE INVENTION

Computing devices have made significant contributions toward the advancement of modern society and are utilized in a number of applications to achieve advantageous results. Numerous devices, such as computers, game consoles, smart phone, and the like have facilitated increased productivity and reduced costs in communicating and analyzing data in most areas of entertainment, education, business and science. A number of computing devices are powered by a rechargeable battery to enable the device to be readily portable. In contrast to computing device that are plugged into an electrical outlet, battery powered computing devices have a finite amount of operating time until the battery needs to be recharged.

The battery powered computing device may include a battery meter that displays an indication of the estimate of the percentage of the total energy storage capacity of the battery that remains or the estimate of the remaining operating time.

The length of the operating time of the computing device varies depending upon how the computing device is being utilized. For example, using spreadsheet and word processing applications may consume power from the battery at a relatively low rate. Watching movies, surfing the internet, and/or sending email messages may consume power at a relatively moderate rate. While playing graphics intensive games may consume power at a relatively high rate.

A number of applications enable a user to specify settings that affect the processing performance of the computing device and/or the power consumption by the computing device. In addition, the operating system of a number of computing devices enables a user to adjust a power plan or scheme depending upon the desired processing performance and/or power consumption. However, there is a continuing need to adjust the power consumption of electronic devices when operating from a battery or other power source having a limited capacity.

SUMMARY OF THE INVENTION

The present technology may best be understood by referring to the following description and accompanying drawings that are used to illustrate embodiments of the present technology.

Embodiments of the present technology are directed toward reducing rendering performance or quality to extend the operating time of the computing platform. In one embodiment, a method includes receiving graphics data from an application. During receipt of the graphics data and rendering of the graphics data, a source of power for a computing platform is determined. The graphics data is rendered using rendering settings received from the application or an operating system if the computing platform is not operating from a limited power source. If the computing platform is operating from a limited power source, a current capacity of the source of power is determined. The graphics data is rendered using the settings received from the application or the operating system if the current capacity of the source of power is above a predetermined level. The graphics data is rendered using a set of graphics processing power conservation settings if the current capacity of the source of power is below the predetermined level.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
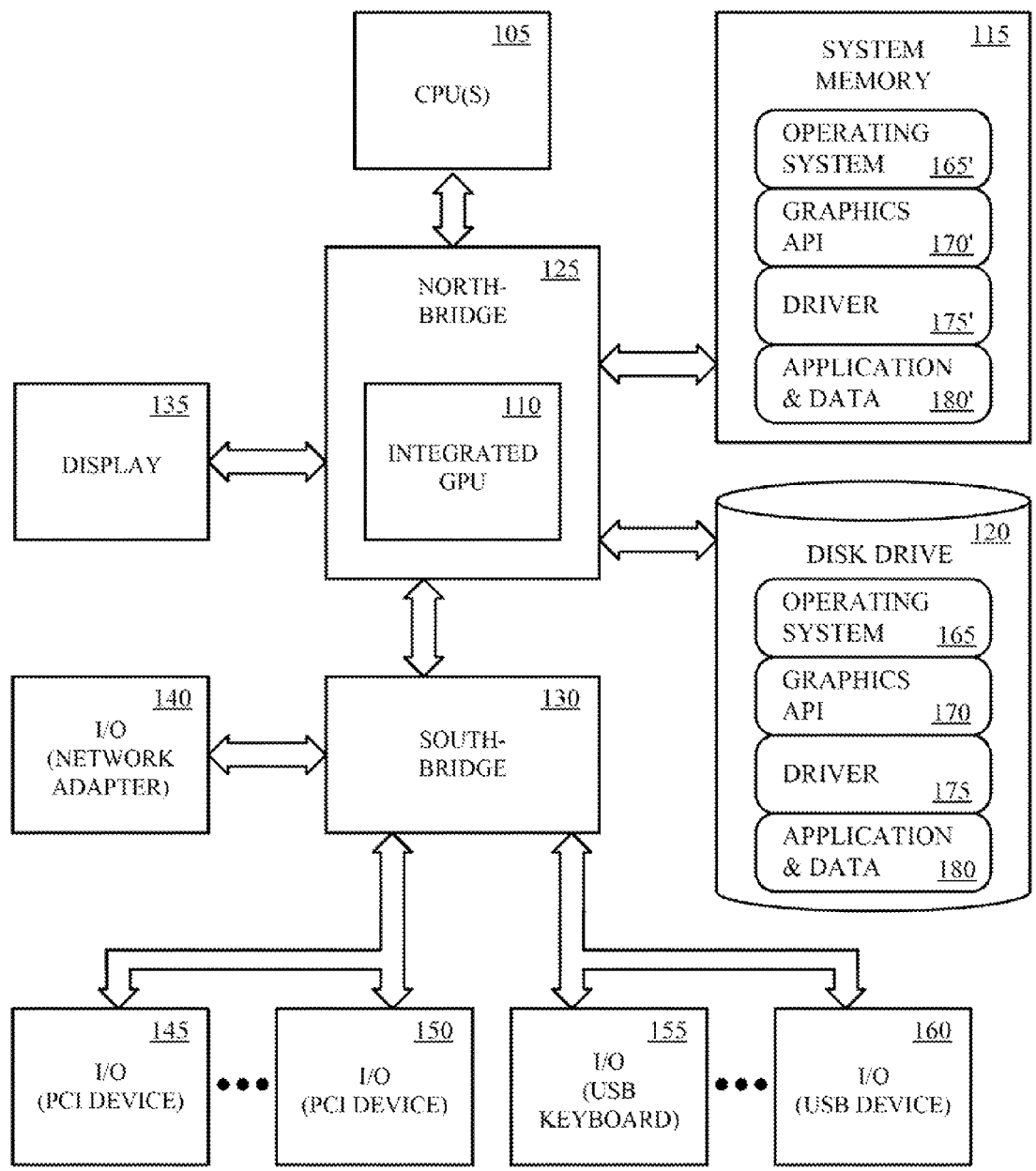
FIG. 1 shows a block diagram of a graphics processing computing platform, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a graphics processing computing platform, in accordance with one embodiment of the present technology, is shown. The exemplary computing platform may include one or more central processing units (CPUs) 105, one or more graphics processing units (GPUs) 110, volatile and/or non-volatile memory (e.g., computer readable media) 115, 120, one or more chip sets 125, 130, and one or more peripheral devices 135-160 communicatively coupled by one or more busses. In one implementation, the GPU 110 may be an integral graphics processing unit (iGPU).

The chipset 125, 130 acts as a simple input/output hub for communicating data and instructions between the CPU 105, the GPU 110, the computing device-readable media 115, 120, and peripheral devices 135-160. In one implementation, the chipset includes a northbridge 125 and southbridge 130. The northbridge 125 provides for communication between the CPU 105, system memory 115 and the southbridge 130. In one implementation, the northbridge 125 includes an integral GPU 110. The southbridge 130 provides for input/output functions. The peripheral devices 135-160 may include a display device 135, a network adapter (e.g., Ethernet card) 140, CD drive, DVD drive, a keyboard, a pointing device, a speaker, a printer, and/or the like.

The computing device-readable media 115, 120 may be characterized as primary memory and secondary memory. Generally, the secondary memory, such as a magnetic and/or optical storage, provides for non-volatile storage of computer-readable instructions and data for use by the computing device. For instance, the disk drive 120 may store the operating system (OS) 165, application programming interfaces (APIs) 170, drivers 175, routines, utilities, applications and data 180. The primary memory, such as the system memory 115 and/or graphics memory, provides for volatile storage of computer-readable instructions and data for use by the computing device. For instance, the system memory 115 may temporarily store all or a portion of the operating system 165', APIs 170', drivers 175', routines, utilities, all or a portion of one or more applications and associated data 180 that are currently used by the CPU 105, GPU 110 and the like.

Figure 2:
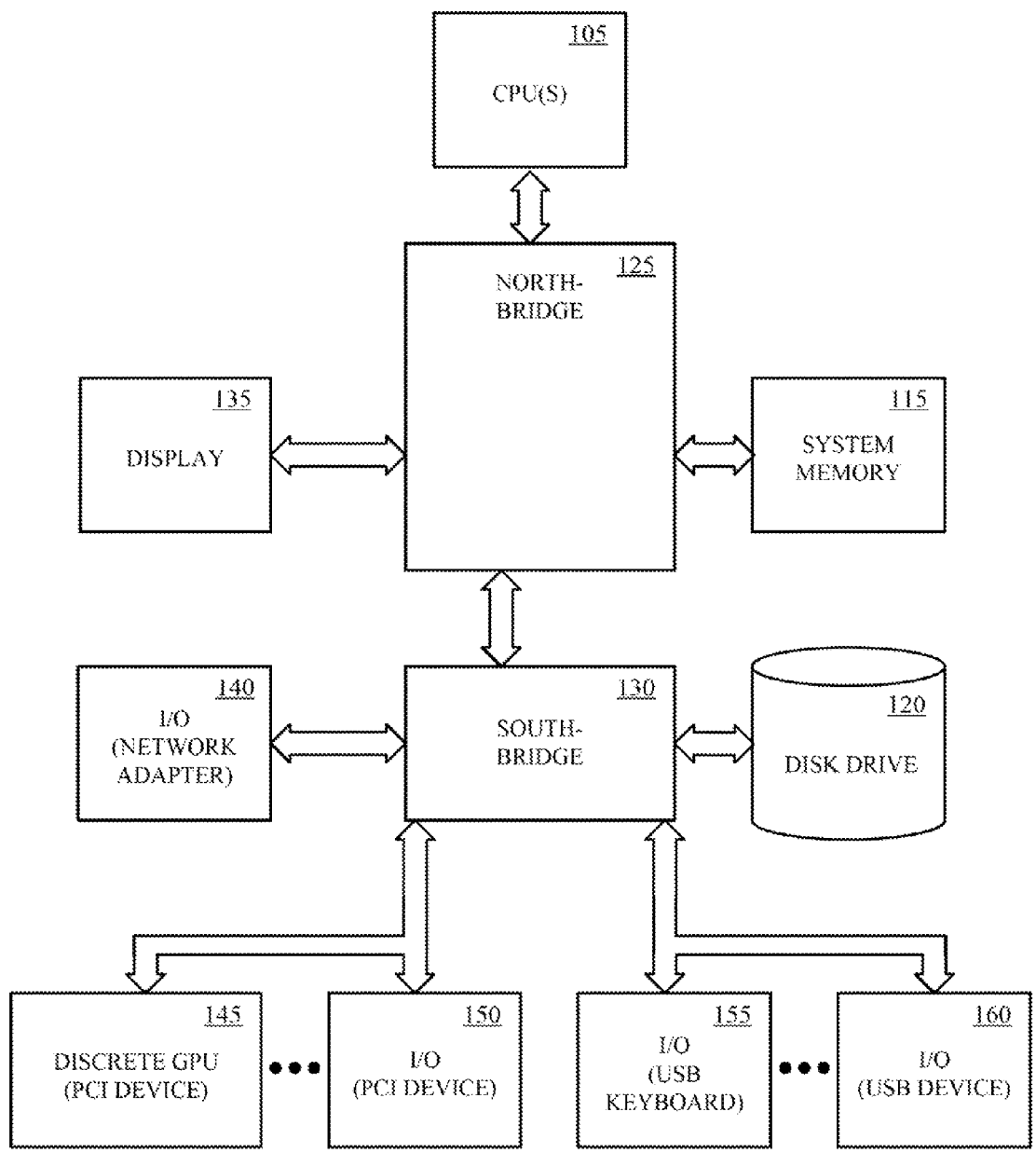
FIG. 2 shows a block diagram of a graphics processing computing platform, in accordance with another embodiment of the present technology.

Referring to FIG. 2, a graphics processing computing platform, in accordance with another embodiment of the present technology, is shown. The exemplary computing platform is substantially similar to the computing platform as described with reference to FIG. 1. However, instead of an integrated GPU 110, the exemplary computing platform includes a discrete graphics processing unit (dGPU) 145. In one implementation, the discrete GPU 145 is coupled as a peripheral device by a bus such as a Peripheral Component Interconnect Express (PCIe) bus. In other implementations, the computing platform may include a graphics processing unit coupled in any other conventional configuration or any similar future configuration. In addition, the computing platform may also include a plurality of graphics processing units configured in one or more combinations of conventional configurations, such as an integral GPU and a discrete GPU, one or more combinations of similar future configurations, and/or one or more combinations of conventional and similar future configurations.

Operation of the graphics processing computing platform will be further explained with reference to FIGS. 3A and 3B, which shows a method of automatically degrading the rendering quality to extend the operating time of the computing platform, in accordance with one embodiment of the present technology. The method may be implemented as computing device-executable instructions (e.g., one or more computer programs) that are stored in computing device-readable media (e.g., computer memory) and executed by one or more processing units (e.g., CPU and/or GPU) of the computing platform. In one implementation, the method may be implemented by an API (e.g., graphics API 170), driver (e.g., kernel mode driver (kmd), user mode driver (umd)) 175, operating system 165, and/or the like.

The method may include a setup stage and a runtime stage. The setup stage may include receiving one or more settings specifying rendering parameters from one or more applications 180 generating graphics data or from the operating system 165 for rendering images by a graphics processing unit of the computing platform, at 305. The settings may include parameter values specifying the resolution, texture detail, anisotropic filtering, antialiasing and/or the like for rendering graphics. For example, the parameter values received from the application 180 and/or operating system 165 may specify rendering at full resolution, with full texture details, with anisotropic filtering turned on, with antialiasing turned on, and the like. The rendering settings received from the application 180 and/or operating systems 165 are referred to hereinafter as the normal rendering settings.

At 310, one or more sets of settings of one or more rendering parameters adapted to conserve power consumption based upon properties of the graphics processing unit are also received. The rendering settings adapted to conserve power consumption based upon properties of the graphics processing unit are hereinafter referred to as the graphics processing power conservation rendering settings. For example, the received graphics processing power conservation rendering settings may specify down sampling the graphics data and then stretching the rendered data back to the display resolution, along with turning off antialiasing. In another example, a first set of power conservation rendering settings specific to the graphics processing unit may specify a first reduction in resolution, along with turning off antialiasing. A second set may specify a second reduction in resolution, a reduction in texture details (e.g., decreased level-of-detail), along with turning off antialiasing and anisotropic filtering.

In one implementation, a graphics application programming interface (API) 170 or a driver 175 may receive the graphics processing power conservation rendering settings from a table or the like. In one implementation, the graphics processing specific power conserving rendering settings may be determined from one or more analytics of the particular graphics processing architecture. In another implementation, the graphics processing power conservation rendering setting may be taken from empirical power measurements on synthetic tests while the given graphics processing unit is being qualified during the graphics processing unit bringup process. The API 170 or driver 175 of the graphics processing unit is advantageously able to determine the graphics processing power conservation rendering settings because the manufacture of the graphics processor and the API 170 and/or driver 175 used with it knows from the design what consumes the most power and the corresponding impact on the rendered image, which varies from one graphics processing unit design to another.

During the runtime stage, graphics data is received from the application 180, at 315. At 320, the source of the power for the computing platform is determined during receipt of the graphics data and rendering thereof. The source of the power for the computing platform may be from a battery or the like, generally providing a limited supply, or from an electrical outlet or the like, generally providing a continuous supply. In one implementation, the source of the power may be determined by receiving a signal indicating the power source when the computing platform is powered on or when the power source changes during operation of the computing platform. In another implementation, the API 170 or driver 175 periodically poles the operating system 165, battery meter or the like to determine the source of the power.

At 325, if the computing platform is not operating from a battery or other limited power supply, the graphics data is rendered using the normal rendering setting received from the corresponding application 180 and/or the operating system 165. For example, the graphics data is rendered at full resolution, with full texture details, with anisotropic filtering turned on, with antialiasing turned on, and the like if the computing platform is not operating from a battery or other limited power source.

If the computing platform is operating from a battery or other limited power supply, it is determined if the capacity of the battery or other limited power supply is less than one or more predetermined levels, at 330. In one implementation, the capacity level is received as an estimated percentage of power storage capacity remaining. In another implementation, the capacity level is received as an estimated operating time remaining. In one implementation the API 170 and/or driver 175 of the graphics processing unit periodically poles the operating system 165 to determine the current capacity level of the power supply. In another implementation, the operating system 165 automatically sends a message to the API 170 and/or driver 175 of the graphics processing unit indicating the capacity level of the supply. The operating system 165 may send a message when the capacity level drops below each of the plurality of predetermined supply levels.

At 335, if the capacity of the battery or other limited power supply is not less than a first of one or more levels, the graphics data is rendered using the normal rendering settings received from the corresponding application 180 and/or operating system 165. For example, the graphics data is rendered at full resolution, with full texture details, with anisotropic filtering turned on, with antialiasing turned on, and the like if the battery or other limited power supply is not less than 25% of capacity or less than 30 minutes of operating time is remaining.

At 340, if the capacity of the battery or other limited power supply is less than the first of one or more levels, the graphics data is rendered using a first of one or more sets of graphics processing unit power conservation rendering parameters. For example, the graphics data is rendered by down sampling the graphics data and then stretching the rendered data back to the display resolution, and with antialiasing turned off, if the battery or other limited power supply is less than 25% of capacity or less than 30 minutes of operating time is remaining. In another example, the graphics data is rendered at a first reduction in resolution, along with antialiasing turned off, if the battery or other limited power supply is less than 33% of capacity or less than 40 minutes of operating time is remaining.

In one implementation, the user may agree to use of the power conserving rendering settings that tradeoff image quality to lengthen the operating time of the computing platform to enable long game play and the like. The user may agree to the use of the power conservation rendering settings during the setup phase or during the runtime operation.

At optional process 345, if the capacity of the battery or other limited power supply is less than another of one or more levels, the graphics data is rendered using another corresponding set of graphics processing unit power conservation rendering parameters. For example, the graphics data is rendered at a second reduction in resolution, with a reduction in texture details, along with antialiasing and anisotropic filtering turned off, if the battery or other limited power supply is less than 20% of capacity or less than 20 minutes of operating time is remaining.

At optional process 350, a message may be output on the display to indicate to a user that the rendering settings have automatically been adjusted, specific to the graphics processing unit of the computing device, to extend the operation of the computing platform when the battery or other limited power supply is less than one or more levels.

The additional supply levels and corresponding power conservation rendering settings specific to the graphics processing unit may be used to progressively override the application or operating system settings. The API 170 or driver 175 of the graphics processor, in response to notifications of the battery level, automatically degrades the rendering precision of graphics content reducing the load on the graphics processing unit. The API 170 or driver 175 may also progressively degrade the rendering precision to reduce the load on the graphics processing unit as the power storage level of the battery or the like continues to decrease. Dynamically lowering the graphics processing load according to such techniques extends for example game play on the computing platform. In one implementation, the techniques for automatically and even progressively degrading the rendering precession using the power conservation rendering settings may be implemented in the Direct3D API, OpenGL API, GFX API or a combination thereof.

Figure 3A:
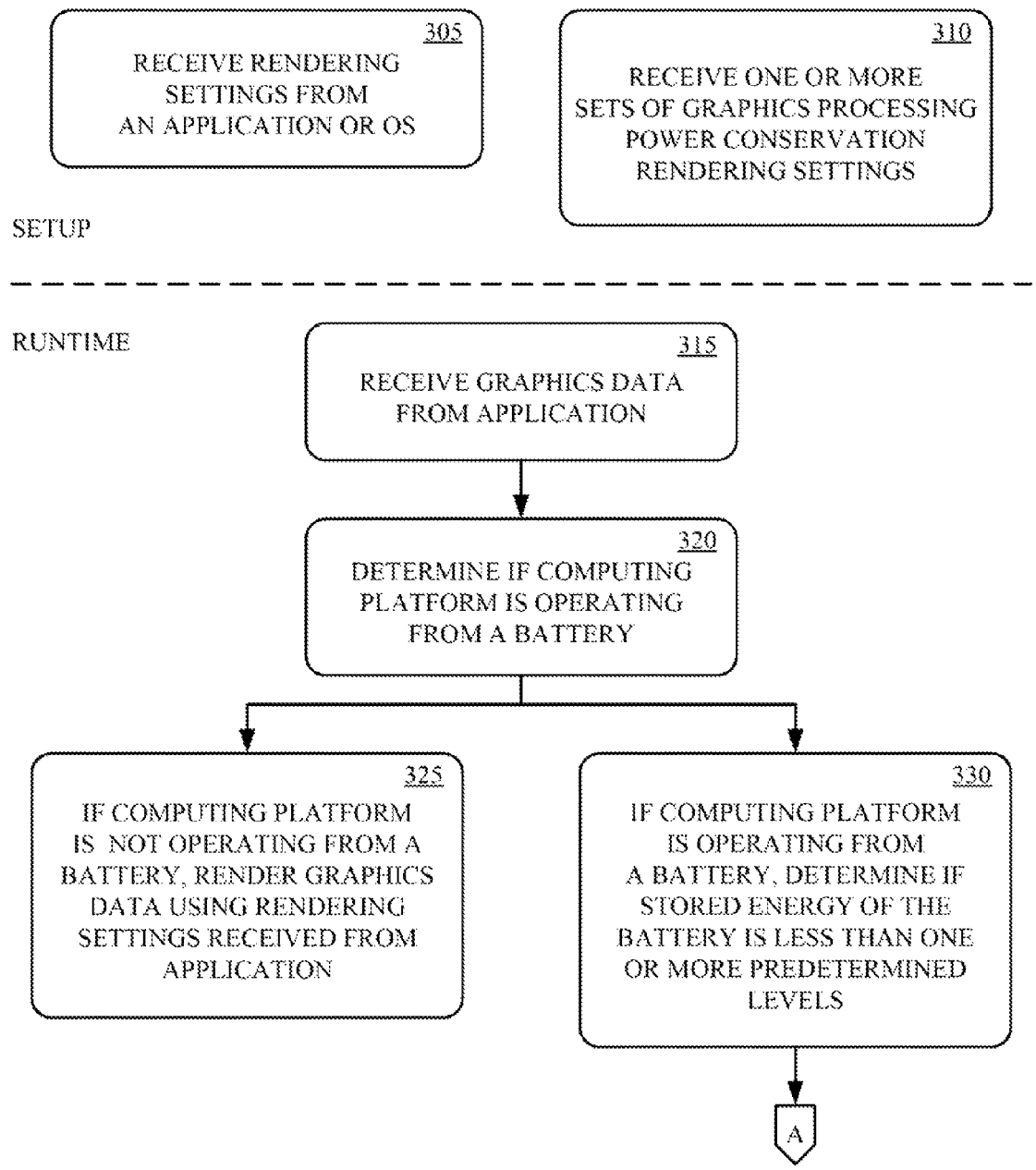
FIGS. 3A and 3B shows a flow diagram of a method of automatically degrading the rendering quality to extend the operating time of the computing platform in accordance with one embodiment of the present technology.
Figure 3B:
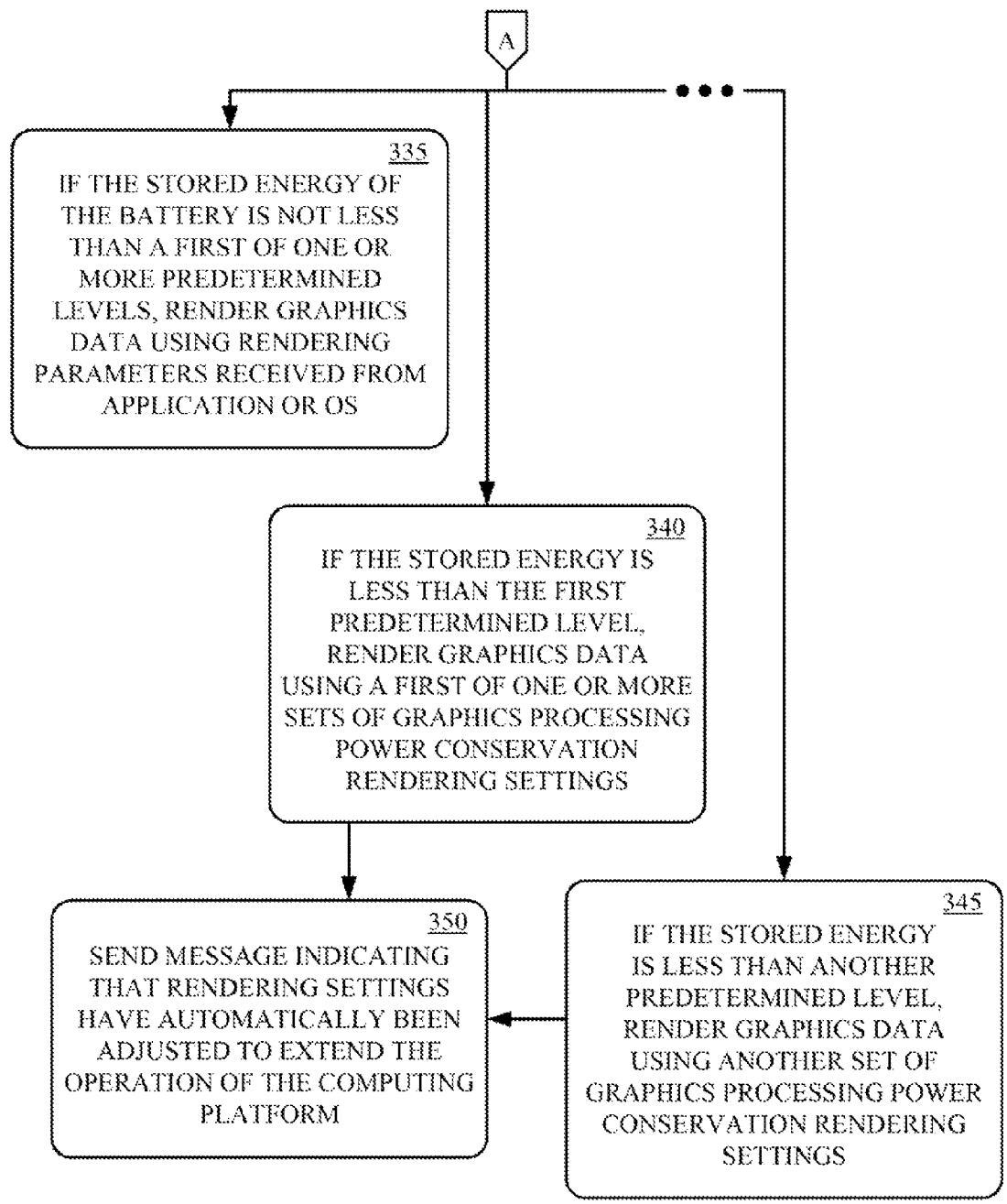

While the method of automatically degrading the rendering quality to extend the operating time of the computing platform illustrated in FIGS. 3A and 3B show specific processes, the present technology is suitable to alternative embodiments. For example, not all the processes provided for in the method are required. Furthermore, additional processes can be added. Likewise, the sequence of processes can be modified depending upon the application. For example, the processes of determining if the computing device is operating from a battery and determining if the stored energy of the battery is less than one or more predetermined levels may be combined. In particular, the battery meter or operating system 165 may indicate whether the current power supply is from a battery of an outlet in combination with the current percentage of energy storage capacity of the battery.

Embodiments of the present technology enable the tradeoff between image quality and operating time of the computing device specific based upon performance metrics of the particular graphics processor. Some image quality may be dynamically reduced to extend the operating time of the computing device by automatically and even progressively overriding the normal rendering settings of the application 180 or operating system 165.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing platform implemented method comprising:
   receiving graphics data from an application;
   determining a source and a level of power for the computing platform during receipt of the graphics data and rendering of the graphics data; and
   rendering, by a particular graphics processing unit (GPU) of the computing platform, the graphics data into a rendered image using,
   rendering settings received from the application if the computing platform is not operating from a limited power supply; and
   one or more sets of graphics processing power conservation rendering settings specific to the particular GPU, determined by an application programming interface or driver of the particular GPU, based upon architecture properties of the particular GPU concerning the power consumed by different parts of the architecture properties and corresponding impact on the rendered image if the computing platform is operating from a limited power supply and the energy of the limited power supply is less than one or more predetermined levels.

2. The method according to claim 1, further comprising sending a message indicating that rendering settings have been adjusted to extend operation of the computing platform when rendering the graphics data using one or more sets of graphics processing power conservation rendering settings.

3. The method according to claim 1, wherein the limited power supply comprises one or more batteries.

4. The method according to claim 1, wherein determining a source and a level of power for the computing platform comprises receiving an indication from a operating system or battery meter indicating the source of the power and an estimated percentage of the capacity of the battery or an estimated remaining operating time.

5. The method according to claim 1, wherein the one or more set of graphics processing power conservation rendering settings are determined from a table.

6. The method according to claim 1, wherein the one or more set of graphics processing power conservation rendering settings are determined from one or more analytics of a particular graphics processing architecture of the computing platform.

7. The method according to claim 1, wherein the one or more set of graphics processing power conservation rendering settings are taken from empirical power measurements on synthetic tests while the particular graphics processing unit of the computing platform is qualified.

8. The method according to claim 1, wherein rendering the graphics data using one or more sets of graphics processing power conservation rendering settings comprises automatically and progressively degrades the precision of the graphics data rendering.

9. The method according to claim 8, wherein automatically and progressively degrading the precision of the graphics data rendering comprises:
   rendering the graphics data using a first set of graphics processing power conservation rendering settings if the energy of the limited power supply is less than a first predetermined level; and
   rendering the graphics data using a second set of graphics processing power conservation rendering settings if the energy of the limited power supply is less than a second predetermined level.

10. The method according to claim 1, wherein the one or more sets of graphics processing power conservation rendering settings tradeoff image quality of the rendered graphics data for increased operating time of the computing platform.

11. One or more non-transitory computing device readable media having instructions stored thereon that, when executed by one or more processing units to perform a method comprising:
    receiving graphics data from an application;
    determining, during receipt of the graphics data and rendering of the graphics data, a source of power for a computing platform including the processing unit and the one or more computing device readable media;
    rendering, by a particular graphics processing unit (GPU) of the computing platform, the graphics data into a rendered image using rendering settings received from the application or an operating system if the computing platform is not operating from a limited power source;
    determining, during receipt of the graphics data and rendering of the graphics data, a current capacity of the source of power if the computing platform is operating from a limited power source;
    rendering, by the particular GPU, the graphics data into the rendered image using rendering settings received from the application or the operating system if the current capacity of the source of power is not below a predetermined level; and
    rendering, by the particular GPU, the graphics data into the rendered image using a set of graphics processing power conservation rendering settings specific to the particular GPU, determined by an application programming interface or driver of the particular GPU, based upon architecture properties of the particular GPU concerning the power consumed by different parts of the architecture properties and corresponding impact on the rendered graphics data if the current capacity of the source of power is below the predetermined level.

12. The one or more non-transitory computing device readable media having instructions stored thereon that, when executed by one or more processing units to perform the method of claim 11, further comprising rendering the graphics data using another set of graphics processing power conservation rendering settings if the current capacity of the source of power is below another predetermined level.

13. The one or more non-transitory computing device readable media having instructions stored thereon that, when executed by one or more processing units to perform the method of claim 11, wherein the predetermined level comprises a first estimated percentage of the energy storage capacity of the source of power of the computing platform.

14. The one or more non-transitory computing device readable media having instructions stored thereon that, when executed by one or more processing units to perform the method of claim 11, wherein the predetermined level comprises a first estimated remaining operating time of the computing platform.

15. The one or more non-transitory computing device readable media having instructions stored thereon that, when executed by one or more processing units to perform the method of claim 11, wherein the rendering settings received from the application or an operating system specifies one or more of rendering at full resolution, with full texture details, with anisotropic filtering turned on, and with antialiasing turned on.

16. The one or more non-transitory computing device readable media having instructions stored thereon that, when executed by one or more processing units to perform the method of claim 11, wherein the set of graphics processing power conservation rendering settings specifies one or more of rendering at a reduced resolution, with reduced texture details, with anisotropic filtering turned off, and with antialiasing turned off.

17. The one or more non-transitory computing device readable media having instructions stored thereon that, when executed by one or more processing units to perform the method of claim 16, wherein the set of graphics processing power conservation rendering settings reduce image quality to increase operating time of the computing platform based upon performance metrics of the particular processing unit rendering the graphics data.

18. The one or more non-transitory computing device readable media having instructions stored thereon that, when executed by one or more processing units to perform the method of claim 11, wherein determining the source of power comprises periodically polling a power source meter or an operating system.

19. The one or more non-transitory computing device readable media having instructions stored thereon that, when executed by one or more processing units to perform the method of claim 11, wherein determining the current capacity of the source of power comprises periodically polling a power source meter or an operating system.

\* \* \* \* \*